Nov. 3, 1970 D. R. ANDREWS 3,537,332

CAPSTAN AND FLYWHEEL ARRANGEMENT FOR MAGNETIC TAPE TRANSPORT

Filed Oct. 23, 1968

INVENTOR.
DALLAS R. ANDREWS

BY Eugene M. Whitacre
Attorney

United States Patent Office 3,537,332
Patented Nov. 3, 1970

3,537,332
CAPSTAN AND FLYWHEEL ARRANGEMENT FOR MAGNETIC TAPE TRANSPORT
Dallas R. Andrews, Indianapolis, Ind., assignor to RCA Corporation, a corporation of Delaware
Filed Oct. 23, 1968, Ser. No. 769,877
Int. Cl. H02k 7/02
U.S. Cl. 74—572 4 Claims

ABSTRACT OF THE DISCLOSURE

A capstan and flywheel mounting arrangement is provided wherein the flywheel is mounted on and rotatably coupled to the capstan by means of a coupling member such that the flywheel is free to seek a plane of rotation perpendicular to its dynamic axis when rotating and the capstan shaft is allowed to rotate free in its bearings.

This invention relates to an improved capstan and flywheel arrangement for use in a magnetic tape transport apparatus.

In the construction of a magnetic tape transport, it is generally the practice to move the tape at a constant speed past one or more transducing heads by means of a pressure roller pressing the tape against a rotating capstan carrying a driven flywheel rigidly affixed thereto. The high inertia of the flywheel tends to maintain the capstan speed constant by resisting (a) speed variations in the motor driven system and (b) changes in the drag force of the moving tape against the capstan. However, to take full advantage of this flywheel effect, and provide a relatively wow and flutter free transport driven system, the capstan must be rotated without run-out, i.e., the periphery of the capstan must be concentric to the capstan axis of rotation. While the bearings supporting the capstan will normally tend to restrict or minimize run-out of the capstan, the oil film surrounding the bearings still leaves room for an excessive run-out if the flywheel is eccentric or off center from the capstan shaft axis. Since, during operation of the transport, rotation of the flywheel will tend to be in a plane through its center of gravity, any variation of the capstan alignment from a right angle to this plane will cause run-out of the capstan and an increase in the wow and flutter performance characteristics of the transport. However, the precision tolerances required to make a suitable aligned rigid flywheel and capstan assembly is often prohibitive in cost for mass productive applications.

Accordingly, it is an object of the present invention to provide an improved capstan and flywheel mounting arrangement for minimum wow and flutter transport characteristics and wherein the tolerance requirements for the alignment orientation of the capstan and flywheel are not critical.

A preferred embodiment of a flywheel and shaft mounting arrangement in accordance with the present invention includes means for mounting the flywheel concentric to the shaft journal in a bearing fit such that the flywheel is free to seek a plane of rotation perpendicular to its dynamic axis when rotating and the shaft is allowed to rotate free in its bearings. Means are provided for coupling the flywheel to a hub member rigidly secured to the shaft so as to provide for cogent rotation of the shaft and flywheel.

Figure 1:
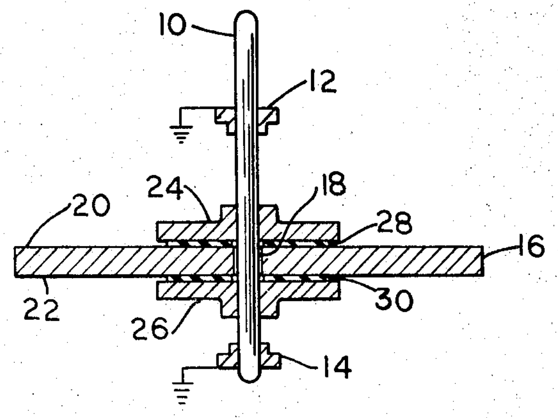
Figure 2:
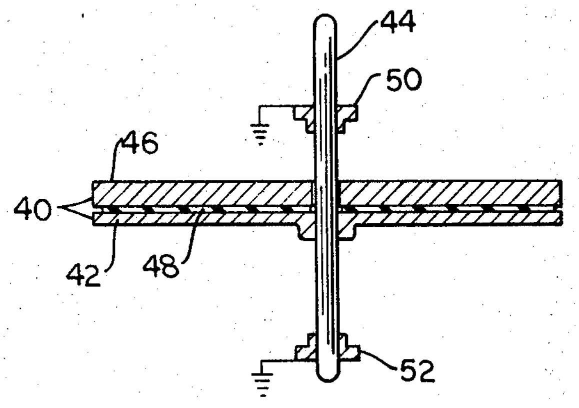

Further objects and advantages of the present invention will become apparent from the following description when taken in connection with the accompanying drawing in which:

FIG. 1 is an elevation view in cross section diagrammatically illustrating one embodiment of a capstan and flywheel arrangement constructed in accordance with the teachings of the present invention; and FIG. 2 is an elevation view in cross section diagrammatically illustrating another embodiment of a capstan and flywheel arrangement of the present invention.

Referring now to the embodiment illustrated in FIG. 1, a capstan shaft 10 of the type normally employed as part of a tape driving system in a tape player apparatus is supportedly journalled for rotation in a pair of bearings 12 and 14 secured to the player apparatus (indicated by the ground reference). To provide inertial stability to the shaft 10 during rotation thereof, a flywheel in the form of a generally circular disc or cylinder 16 having a central aperture 18 is mounted on the shaft 10. The flywheel aperture 18 is suitably dimensioned relative to the shaft diameter so as to provide sufficient clearance for a bearing fit of the flywheel 16 mounting on the shaft 10. Positioned in supporting relation to the top and bottom surfaces 20 and 22 of the flywheel 16 are a pair of hub members 24 and 26 rigidly secured to the shaft 10 for concurrent rotation therewith. Compliant means, as for example a pair of rubber washer members 28 and 30 are respectively positioned adjacent the top and bottom surfaces 20 and 22 of the flywheel 16 so as to provide a frictional coupling between the hub members 24 and 26 and the flywheel 16 sufficient to cause the flywheel to be rotated concurrent with the hub members 24 and 26. Fastening means such as an adhesive coating may be applied to one side of each of the washers 28 and 30 in addition to pressure from the hub members 24 and 26 acting against the washers to insure a slip free coupling between the flywheel and the hub members. In addition to rubber, other compliant means found suitable for coupling the flywheel to the hubs include grease and an oil film.

By mounting the flywheel to the capstan with a compliant member, the flywheel is permitted to rotate in a plane about its center of gravity and the capstan is allowed to rotate freely in its bearings. The compliant members allow the flywheel to seek a plane of rotation substantially perpendicular to its axis by natural forces. Thus, the flywheel may be constructed inexpensively as by a stamping from sheet stock.

Referring now to FIG. 2 there is illustrated therein another embodiment of a capstan and flywheel arrangement in accordance with the present invention. In this embodiment, a flywheel 40 may be considered to comprise a first portion 42 in the form of a hub member rigidly secured to the capstan shaft 44, as by a press fit, and a second portion 46 freely mounted in a bearing fit on the capstan shaft 44 and coupled to the first flywheel portion 42 for rotation therewith by means of a frictional member 48 and the gravitational weight of the flywheel second portion against the member 48. The capstan shaft is aligned for rotation about a vertical axis by means of bearings 50 and 52. Thus, the first portion 42 of the flywheel is fixed to the capstan shaft 44, while the second portion 46 is rotatably coupled to the capstan shaft and is free on the shaft to seek a plane of rotation perpendicular to its axis.

What is claimed is:

1. In a tape transport system of the type wherein a type is passed between a rotating capstan and a pressure roller, an improved flywheel construction and mounting arrangement for a journalled capstan comprising:
   a centrally apertured flywheel;
   means mounting said flywheel on said capstan such that said capstan is received through said aperture with sufficient clearance to provide a bearing fit;
   support means including a hub member axially carried by and rigidly secured to said capstan for rotation therewith and in supporting relation to said flywheel, said support means further including complaint means coupling said flywheel to said hub member for cogent rotation therewith; and said flywheel asuming a plane of rotation perpendicular to its dynamic axis during rotation of said capstan such that said capstan causes said tape to be driven at a uniform speed.

2. An improved flywheel construction and mounting arrangement for a journalled capstan as defined in claim 1 wherein said complaint means comprises a rubber washer sandwiched between said flywheel and hub member to frictionally couple said flywheel to said hub member.

3. In a tape transport system of the type wherein a tape is passed between a rotating capstain and a pressure roller, an improved flywheel construction and mounting arrangement for a journalled capstan comprising:

a centrally apertured flywheel;

means mounting said flywheel on said capstan such that said capstan is received through said aperture with sufficient clearance to provide a bearing fit;

a pair of hub members rigidly secured to said capstan and disposed on opposite sides of said flywheel;

means sandwiched between said hub members and said opposite sides of said flywheel for frictionally coupling said flywheel to said hub members for cogent rotation therewith; and said flywheel assuming a plane of rotation perpendicular to its dynamic axis during rotation of said capstan such that said capstan causes said tape to be driven at the uniform speed.

4. In a tape transport system of the type wherein a tape is passed between a rotating capstan and a pressure roller, an improved flywheel construction and mounting arrangement for a journalled capstan comprising:

a centrally apertured flywheel;

a hub member concentrically mounted on and secured to said capstan for rotation therewith, said hub member having a diameter substantially equal to that of said flywheel;

means mounting said flywheel on said capstan and adjacent said hub member such that said capstan is received through said aperture with sufficient clearance to provide a bearing fit;

means sandwiched between said flywheel and said hub member for frictionally coupling said flywheel to said hub member for cogent rotation therewith; and said flywheel assuming a plane of rotation perpendicular to its dynamic axis during rotation of said capstan such that said capstan causes said tape to be driven at a uniform speed.

References Cited

UNITED STATES PATENTS

| | | | |
|---|---|---|---|
| 2,013,109 | 9/1935 | Reynolds | 74—572 |
| 2,278,680 | 4/1942 | Thompson | 74—572 XR |
| 2,794,605 | 6/1957 | Minter | 74—572 XR |
| 3,368,424 | 2/1968 | Clerk | 74—572 |

FRED C. MATTERN, Jr., Primary Examiner

F. D. SHOEMAKER, Assistant Examiner

UNITED STATES PATENT OFFICE
CERTIFICATE OF CORRECTION

Patent No. 3,537,332 Dated November 3, 1970

Inventor(s) Dallas R. Andrews

It is certified that error appears in the above-identified patent and that said Letters Patent are hereby corrected as shown below:

In Column 1, line 31, "driven" should read -- drive --; line 34, "driven" should read -- drive --; line 49, "productive" should read -- production --. In Column 2, line 59, "type" (second occurrence) should read -- tape --.

SIGNED AND SEALED
JAN 19 1971

(SEAL)
Attest:

Edward M. Fletcher, Jr.
Attesting Officer

WILLIAM E. SCHUYLER, JR.
Commissioner of Patents